United States Patent [19]

Casper et al.

[11] Patent Number: 4,839,447
[45] Date of Patent: Jun. 13, 1989

[54] POLYMERIZATION OF CHLOROPRENE

[75] Inventors: Rudolf Casper; Peter Wendling, both of Leverkusen, Fed. Rep. of Germany; Wolfgang Konter, Houston, Tex.; Gerhard Hohmann, Leverkusen, Fed. Rep. of Germany

[73] Assignee: Bayer Aktiengesellschaft, Leverkusen-Bayerwerk, Fed. Rep. of Germany

[21] Appl. No.: 223,092

[22] Filed: Jul. 22, 1988

Related U.S. Application Data

[63] Continuation-in-part of Ser. No. 141,273, Jan. 6, 1988, which is a continuation of Ser. No. 12,182, Feb. 9, 1987, abandoned.

[30] Foreign Application Priority Data

Feb. 19, 1986 [DE] Fed. Rep. of Germany ....... 3605332
Feb. 12, 1987 [EP] European Pat. Off. ........... 87101978
Feb. 19, 1987 [JP] Japan .................................. 62-34697

[51] Int. Cl.$^4$ .............................................. C08F 2/24
[52] U.S. Cl. ................................... 526/225; 526/220; 526/234
[58] Field of Search ...................... 526/225, 220, 234

[56] References Cited

U.S. PATENT DOCUMENTS

| | | | |
|---|---|---|---|
| 4,035,564 | 7/1977 | Bibeau | 526/295 |
| 4,124,754 | 11/1978 | Miller | 526/220 |
| 4,417,036 | 11/1983 | Nolte | 526/211 |
| 4,525,561 | 6/1985 | Casper | 526/220 |

*Primary Examiner*—Christopher Henderson
*Attorney, Agent, or Firm*—Connolly and Hutz

[57] ABSTRACT

Storage-stable polychloroprene is obtained, using a polymerization initiator comprising a mixture of (1) a redox system comprising
 (a) a reducing agent selected from the group consisting of
  (i) sodium dithionite,
  (ii) formamidine sulphinic acid, and
  (iii) a mixture from (i) and (ii),
 (b) potassium peroxodisulphate as an oxidizing agent and, optionally,
(2) sodium anthraquinone-$\beta$-sulphonate as a co-activator in the presence of oxygen, wherein from 10 to 90 by weight of the initiator are present at the commencement of polymerization and the remainder is added during the polymerization, and after a certain degree of conversion the reducing agent is the only component of redox system (1) which remains to be added.

11 Claims, No Drawings

POLYMERIZATION OF CHLOROPRENE

This is a continuation-in-part application of parent application Ser. No. 141,273, filed Jan. 6, 1988, which in turn is a continuation application of grandparent application Ser. No. 012,182, filed Feb. 9, 1987, now abandoned.

The invention relates to a process for the preparation of storage-stable chloroprene polymers using a polymerization initiator obtained from or comprising a redox system, part of this initiator being added at the commencement of the polymerization and the remaining part being metered in, in one or more portions or continuously, during the polymerization.

It is usual to protect 2-chlorobutadiene (=chloroprene) against uncontrolled and premature polymerization by adding stabilizers, such as phenothiazine, and to leave these stabilizers in the monomer during the polymerization, since it thereby becomes unnecessary to store the unstabilized chloroprene in a freezer and to protect it vigorously against contact with air.

Now, the expert knows that the free radical-initiated emulsion polymerization of chloroprene cannot be started in the presence of stabilizers and/or traces of oxygen, or can only be started with very great delay.

In addition, even relatively low, technically unavoidable variations of the stabilizer content in the monomer result in relatively large variations of the start-up and an irregular course of the polymerization and thus a deterioration of the product quality.

In EP-A-34,747, a process is described for the polymerization of chloroprene using initiator systems based on sodium dithionite. In this process, however, precisely in the case of the continuous manner of polymerization, the desired monomer conversion ratio cannot be produced in the individual reactors since the catalyst is added in a single portion at the start of the reaction.

This can lead to problems in heat dissipation and thus to losses in quality.

In addition, complete consumption of the peroxide initiator is not absolutely guaranteed by the choice of the peroxide/dithionite initiator ratio. As the expert knows, however, just such excess of peroxide has a negative effect on the product properties of the finished polymer.

The invention thus has the object of finding a process for the polymerization of chloroprene which enables reproducible storage-stable polychloroprene to be prepared.

The invention therefore relates to a process for the preparation of chloroprene polymers by aqueous emulsion polymerization of phenothiazine compound-stabilized chloroprene or of a mixture of chloroprene and up to 20% by weight, based on the total quantity of monomer to be polymerized, of one or more comonomers which can be copolymerized with chloroprene, using a polymerization initiator comprising a mixture of
(1) a redox system comprising:
  (a) a reducing agent selected from the group consisting of
    (i) sodium dithionite,
    (ii) formamidine sulphinic acid, and
    (iii) a mixture from (i) and (ii),
  (b) potassium peroxodisulphate as an oxidizing agent and, optionally,
(2) sodium anthraquinone-$\beta$-sulphonate as a co-activator in the presence of oxygen, which is characterized in that from 10 to 90, preferably 30 to 90, % by weight of the initiator are present at the commencement of polymerization and the remainder is added during the polymerization, and as from 1 to 20, preferably 2 to 10, % below the desired final degree of conversion the reducing agent is the only component of redox system (1) which remains to be added, this finally added portion of reducing agent being from 5 to 40, preferably 7 to 30, % of the total amount of reducing agent (a).

According to a preferred feature of the invention, the reducing agent (a) comprises (i) sodium dithionite and, optionally, (ii) formamidine sulphinic acid. The most preferred reducing agent (a) consists of (i) sodium dithionite.

Relative to the monomers to be polymerized, from 0.005 to 1.0, preferably 0.01 to 0.6, particularly 0.01 to 0.3, % by weight of reducing agent (a) are employed.

If the initiator comprises components 1(a)(i), 1(a)(ii), 1(b) and 2, the preferred amounts range from
0.005 to 0.5, preferably 0.01 to 0.2, % by weight of sodium dithionite,
0.01 to 0.9, preferably 0.05 to 0.5, % by weight of formamidine sulphinic acid,
0.005 to 0.75, preferably 0.01 to 0.5, % by weight of potassium peroxodisulphate, and
0.005 to 0.2, preferably 0.01 to 0.1, % by weight of sodium anthraquinone-$\beta$-sulphonate,
all percentages being based on monomer to be polymerized.

If the initiator comprises components 1(a)(i), 1(b) and 2, the preferred amounts range from
0.01 to 0.5, preferably 0.02 to 0.25, % by weight of sodium dithionite,
0.005 to 0.75, preferably 0.01 to 0.5, % by weight of potassium peroxodisulphate, and
0.005 to 0.2, preferably 0.01 to 0.1, % by weight of sodium anthraquinone-$\beta$-sulphonate,
all percentages being based on monomer to be polymerized.

If the initiator comprises components 1(a)(i), 1(a)(ii) and 1(b), the preferred amounts range from
0.005 to 0.5, preferably 0.01 to 0.2, % by weight of sodium dithionite,
0.01 to 1.0, preferably 0.05 to 0.5, % by weight of formamidine sulphinic acid, and
0.005 to 0.75, preferably 0.01 to 0.5, % by weight of potassium peroxidisulphate,
all percentages being based on monomer to be polymerized.

If the initiator comprises components 1(a)(i) and 1(b), the preferred amounts range from
0.01 to 0.5, preferably 0.02 to 0.25, % by weight of sodium dithionite, and
0.005 to 0.75, preferably 0.01 to 0.5, % by weight of potassium peroxodisulphate, all percentages being based on monomer to be polymerized.

Within the above specified ranges, the components of the initiator system are preferably used in the following ratios (by weight, if not otherwise specified):
sodium dithionite/other initiator components=1:(0.05 to 5), preferably 1:(0.1 to 3);
sodium dithionite/potassium peroxodisulphate=(1 to 3):1, preferably (1 to 2):1 (molar ratio);
formamidine sulphinic acid/potassium peroxodisulphate =from (1:10) to (10:1); and potassium peroxodisulphate/sodium anthraquinone-β-sulphonate =from (2:1) to (100:1), preferably (2:1) to (10:1).

The known anionic, cationic, non-ionic and amphoteric surface-active compounds can be employed as emulsifiers. The emulsifiers are employed, alone or combined, in such amounts which ensure a surface-active action. The amounts vary, depending on the type of the compounds used and the pH range, between the order of magnitude 2 and 6% by weight, relative to the amount of monomer employed. The polymerization is carried out at 0° to 70° C., 0° to 55° C. being preferred.

The monomers are conventionally reacted to the extent of 60 to 99%, preferably 63 to 95%, depending on the proposed use of the polymer, conversion of between 63 to 70% being suitable for solid rubbers in order to achieve advantageous applicational values, whereas latices which are required for the hardening of paper or the treatment of bitumen are produced with a high conversion of up to 99%, preferably 85 to 99%.

Suitable comonomers are, for example, acrylonitrile, methacrylonitrile, acrylates, methacrylates, vinylidene chloride, sytrene, vinyltoluenes, (1,3)-butadiene, 1-chloro-(1,3)-butadiene, 2,3-dichloro-(1,3)-butadiene, 2-chloro-3-methyl-(1,3)-butadiene and sulphur, sulphur and 2,3-dichloro-(1,3)-butadiene being preferred.

The structure and the properties of the polymers can be varied within broad limits by adding known compounds, for example mercaptans, which are active as regulators.

The amount of regulator is preferably 0.3 to 5 mmol per 100 g of monomer.

Preferred chain transfer agents are aliphatic mercaptans, particularly those having 8 to 18 carbon atoms. The mercaptans can be straight-chain or branches. Thus, primary, secondary and tertiary mercaptans can be used, but the most preferred mercaptan is n-dodecyl mercaptan. Other known chain transfer agents, for example aromatic disulphides or xanthogene disulphides, particularly xanthogene disulphides, as described in EP-A (European Specification) No. 53,319, can also be used. A preferred xanthogene disulphide is bis(5-ethyl-1,3-dioxan-5-yl-methyl)-xanthogene disulphide.

Unreacted organic compounds can be removed after the reaction by steam distillation, for example at 50° C. and an absolute pressure of 20 torr.

The polymerization experiments described in the following examples were carried out to achieve particularly defined reaction conditions in a 6 reactor cascade operated continuously.

This continuous polymerization of chloroprene is known from U.S. Pat. Nos. 2,384,277, 2,394,291 and 2,831,842.

The monomer, including stabilizer and regulator, was pre-emulsified in the aqueous phase containing the emulsifier and caustic lime, and then reached the reaction vessel into which the initiator was additionally metered in. Analogous results for the polymerization were also obtained without pre-emulsification.

After leaving the stirred vessel cascade, the reaction was terminated by addition of known terminators such as t-butyl-pyrocatechol or diethylhydroxylamine and simultaneous removal of the monomer. The pH of the alkaline latex was reduced to pH 6.5 by means of dilute acetic acid and the polymer was isolated from this emulsion by freeze coagulation and dried (Chem. Progr. 43, 391 (1974), German Patent Specification No. 1,051,506).

EXAMPLES

Comparison Example

The aqueous phase (W) and the monomer phase (M) were fed, via a measurement and regulation apparatus, in a constant ratio into the first reactor of a polymerization cascade comprising 6 identical reactors each having a volume of 50 liters. The average residence time per vessel was 30 minutes. The activator phases A1 and A2 were metered into the reactors 2 to 6 (polymerization vessels 1 to 5); see Table 1. The polymerization was carried out on the basis of the formulation below. The actual amounts are calculated from the formulation, the densities of the individual phases, the reactor volume which was flooded, and the average residence time per reactor.

|  | parts by weight |
|---|---|
| (M) = Monomer phase: | |
| Chloroprene | 100.0 |
| n-Dodecyl mercaptan | 0.13 |
| Phenothiazine | 0.015 |
| (W) = Aqueous phase: | |
| Demineralised water | 140.0 |
| Sodium salt of a disproportionated abietic acid | 6.0 |
| Sodium salt of a condensation product of naphthalenesulphonic acid and formaldehyde | 0.7 |
| Caustic soda | 0.63 |

(A1)=Activator phase 1

Potassium peroxodisulphate, 3% strength by weight aqueous solution; for amounts see Table 1.

(A2)=Activator phase 2

Sodium dithionite, 1% strength by weight aqueous solution; for amounts see Table 1.

The reaction started in the 1st polymerization vessel at an internal temperature of 11° C. The liberated heat of polymerization was dissipated and the polymerization temperature reduced to 10° C. by means of external cooling. The reaction mixture passed through the stirred vessel cascade corresponding to the feed into the 1st vessel. The reaction was terminated by addition of 0.1 part by weight of diethylhydroxylamine at a monomer conversion of 65%. The remaining monomer was removed from the polymer by steam distillation and the polymer latex, after reducing the pH to 6.5, was frozen out on a chill roll and isolated. The Mooney viscosity of the polymer was 94 ML 1+4 (100° C.).

Example According to the Invention

The procedure as in the Comparison Example was carried out, but the addition of the activator phases was changed: Whereas according to the Comparison Example both the activator phases were introduced into each polymerization vessel, only activator phase 2 was introduced into the last polymerization vessel in the present Example; see Table 1 for amounts. At a conversion rate of 66%, the polymerization was terminated in the same way as in the Comparison Example and worked up. The obtained polymer had a Mooney viscosity of 93 ML 1+4 (100° C.).

Chloroprene polymers which have been prepared according to the invention have a markedly better quality level than products prepared according to the state of the art, shown, for example, by the storage stability.

Properties (Storage Stability)

The coverage and processibility of polychloroprene adhesive solutions, particularly with machinery, are, to a large extent, dependent on the adhesive viscosity. The viscosity of an adhesive must therefore remain substantially constant during its storage in order to ensure constant processibility and adhesive strength. The determination of the viscosity stability of adhesive solution is suitable here as a test method.

A. Preparation of the adhesive solution:

33 g of polymer were dissolved, with stirring, in 117 g of a solvent mixture comprising ethyl acetate/benzine having the boiling limits 65/95° C., and toluene in the weight ratio 2:2:1 in a 250 g wide-necked bottle with screw cap. To this purpose, the polymer was cut into pieces of diameter about 5 mm. The dissolution was carried out in the sealed bottle (screw cap with hole) within 16 hours at 300 rpm.

B. Measurement of the viscosity of adhesives using a Brookfield rotation viscosimeter:

After dissolution, a viscosity of 10 Pa·s was set at 23° C. using the Brookfield LVT viscosimeter by further addition of the solvent mixture used. The measurements were based on DIN 53 019, January 1979 draft.

The viscoelasticity of the solution was determined by method B after storage times of 0 and 14 days, 1, 3 and 6 months at 23° C. storage temperature (Table 2).

The measurement values should, if possible, remain constant. Large deviations on both sides are not desired.

TABLE 1

| | Preparation of polychloroprene | | | | | | | | | |
|---|---|---|---|---|---|---|---|---|---|---|
| | Comparison Example | | | | | Example according to the invention | | | | |
| Polymerization vessel | PS [parts by weight] | Na—D | PS [% by weight]* | Na—D | conversion degree [%] | PS [parts by weight] | Na—D | PS [% by weight]* | Na—D | Conversion degree [%] |
| 1 | 0.0600 | 0.0440 | 86.6 | 75.7 | 14 | 0.0630 | 0.0440 | 89.5 | 69.6 | 15 |
| 2 | 0.0030 | 0.0028 | 4.3 | 4.8 | 31 | 0.0037 | 0.0026 | 5.3 | 4.1 | 34 |
| 3 | 0.0030 | 0.0030 | 4.3 | 5.2 | 50 | 0.0034 | 0.0024 | 4.8 | 3.8 | 52 |
| 4 | 0.0003 | 0.0003 | 0.4 | 0.5 | 59 | 0.0003 | 0.0002 | 0.4 | 0.3 | 60 |
| 5 | 0.0030 | 0.0080 | 4.3 | 13.8 | 65 | 0 | 0.0140 | 0 | 22.2 | 66 |
| Sum | 0.0693 | 0.0581 | 99.9 | 100.0 | | 0.0704 | 0.0632 | 100.0 | 100.0 | |

*of total amount
PS = potassium peroxodisulphate; Na—D = sodium dithionite
The addition of PS and Na—D was so metered that the internal temperature did not exceed 11° C.; this is the reason for slight differences in the added amounts per vessel; however, the amounts added per cascade were nearly identical.

TABLE 2

| | Viscoelasticity (Pa's) | |
|---|---|---|
| Polymer from: | Comparison Example | Example |
| 0 days | 10 | 10 |
| 14 days | 13 | 10 |
| 1 month | 16 | 10 |
| 3 months | 18 | 9.5 |
| 6 months | 24 | 9.5 |

What we claim is:

1. Process for the preparation of chloroprene polymers by aqueous emulsion polymerization of phenothiazine compound-stabilized chloroprene or a mixture of chloroprene and up to 20% by weight of one or more monomers which can be copolymerized with chloroprene, using a polymerization initiator comprising a mixture of:
   (a) a reducing agent selected from the group consisting of
      (i) sodium dithionite,
      (ii) formamidine sulphinic acid, and
      (iii) a mixture from (i) and (ii),
   (b) potassium peroxidisulphate as an oxidizing agent and, optionally,
   (2) sodium anthraquinone-β-sulphonate as a co-activator
   in the presence of oxygen, which is characterized in that from 10 to 90% by weight of the initiator are present at the commencement of polymerization and the remainder is added during the polymerization, and as from 1 to 20% below the desired final degree of conversion the reducing agent is the only component of redox system (1) which remains to be added, this finally added portion of reducing agent being from 5 to 40% of the total amount of reducing agent (a).

2. Process according to claim 1, characterized in that from 30 to 90% by weight of the initiator are present at the commencement of polymerization.

3. Process according to claim 1, characterized in that as from 2 to 10% below the desired final degree of conversion the reducing agent is the only component of redox system (1) which remains to be added.

4. Process according to claim 1, characterized in that the finally added portion of reducing agent is from 7 to 30% of the total amount of reducing agent (a).

5. Process according to claim 1, characterized in that the reducing agent (a) comprises sodium dithionite and formamidine sulphinic acid.

6. Process according to claim 1, characterized in that the reducing agent (a) consists of sodium dithionite.

7. Process according to claim 1, characterized in that the polymerization is carried out at 0° to 70° C.

8. Process according to claim 1, characterized in that the polymerization is carried out in the presence of a regulator.

9. Process according to claim 8, characterized in that the amount of regulator is 0.3 to 5 mmol per 100 g of monomer.

10. Process according to claim 1, characterized in that 2,3-dichlorobutadiene and sulphur are used as co-monomers.

11. Process according to claim 1, characterized in that it is carried out continuously.

* * * * *

UNITED STATES PATENT AND TRADEMARK OFFICE
CERTIFICATE OF CORRECTION

PATENT NO. : 4,839,447

DATED : June 13, 1989

INVENTOR(S) : Rudolf Casper; Peter Wendling; Wolfgang Konter; Gerhard Hohmann

It is certified that error appears in the above-identified patent and that said Letters Patent is hereby corrected as shown below:

Column 6, between lines 2 and 3,

--(1) a redox system comprising-- should be inserted.

Signed and Sealed this

Twenty-fifth Day of September, 1990

*Attest:*

HARRY F. MANBECK, JR.

*Attesting Officer*   *Commissioner of Patents and Trademarks*